_US006040051A_

United States Patent [19]
Yamamoto et al.

[11] Patent Number: 6,040,051
[45] Date of Patent: Mar. 21, 2000

[54] CARBON FIBERS AND PROCESS FOR THEIR PRODUCTION, AND FIBER-REINFORCED RESIN COMPOSITION EMPLOYING THEM

[75] Inventors: Iwao Yamamoto; Eisaku Kakikura; Masami Kinouchi; Yoshiaki Inoue; Tamotsu Shiotsu, all of Sakaide, Japan

[73] Assignee: Mitsubishi Chemical Corporation, Tokyo, Japan

[21] Appl. No.: 09/011,064

[22] PCT Filed: Jun. 10, 1997

[86] PCT No.: PCT/JP97/01985

§ 371 Date: Feb. 10, 1998

§ 102(e) Date: Feb. 10, 1998

[87] PCT Pub. No.: WO97/47799

PCT Pub. Date: Dec. 18, 1997

[30] Foreign Application Priority Data

Jun. 10, 1996 [JP] Japan .................................. 8-147033
Sep. 19, 1996 [JP] Japan .................................. 8-247947

[51] Int. Cl.$^7$ ...................................... B32B 9/00
[52] U.S. Cl. ...................... 428/367; 428/359; 428/375; 428/378; 428/408; 423/447.1; 423/447.2; 423/447.3; 523/205; 523/215; 524/496; 427/384
[58] Field of Search .................................. 428/367, 364, 428/375, 378, 408, 359; 423/447.1, 447.2, 447.3; 523/205, 215; 524/496; 427/384

[56] References Cited

U.S. PATENT DOCUMENTS

| | | | |
|---|---|---|---|
| 3,921,874 | 11/1975 | Spain . | |
| 5,213,677 | 5/1993 | Yamamoto et al. . | |
| 5,229,202 | 7/1993 | Tomono et al. ........................ | 428/378 |
| 5,348,719 | 9/1994 | Yamamoto et al. . | |
| 5,601,794 | 2/1997 | Yamamoto et al. . | |
| 5,639,807 | 6/1997 | Secrist et al. .......................... | 523/215 |
| 5,641,572 | 6/1997 | Yoshimura et al. .................... | 428/408 |
| 5,643,546 | 7/1997 | Yamamoto et al. . | |
| 5,679,149 | 10/1997 | Tezuka et al. ......................... | 428/378 |
| 5,686,181 | 11/1997 | Takano et al. ......................... | 428/367 |
| 5,721,308 | 2/1998 | Yamamoto et al. . | |
| 5,817,418 | 10/1998 | Goto et al. ............................. | 428/408 |
| 5,855,663 | 1/1999 | Takano et al. ......................... | 328/378 |

FOREIGN PATENT DOCUMENTS 37 34 226   4/1989   Germany .

OTHER PUBLICATIONS

D.R. Lovell, Chapman & Hall, pp. 53–54; 57–60, and 95, "Carbon and High Performance Fibres", 1991.

*Primary Examiner*—William Krynski
*Assistant Examiner*—J. M. Gray
*Attorney, Agent, or Firm*—Oblon, Spivak, McClelland, Maier & Neustadt, P.C.

[57] ABSTRACT

Bundled and cut carbon fibers having a bulk density of from 450 g/l to 650 g/l, which are obtained by bundling carbon fibers having a yield of at least 0.9 g/m followed by cutting, and having a collapse initiating angle and funnel drop time of at most 65° and at most 20 seconds, respectively.

15 Claims, No Drawings

CARBON FIBERS AND PROCESS FOR THEIR PRODUCTION, AND FIBER-REINFORCED RESIN COMPOSITION EMPLOYING THEM

BACKGROUND OF THE INVENTION

The present invention relates to carbon fibers which are useful mainly for producing a fiber-reinforced thermoplastic resin composition by mixing them with a resin and a process for their production, and a fiber-reinforced resin composition employing them.

DESCRIPTION OF THE BACKGROUND

In recent years, a fiber-reinforced resin composition having carbon fibers mixed and dispersed in various matrix resins, has attracted an attention as an industrially important material by virtue or its mechanical properties such as high strength, high rigidity, low specific gravity and high abrasion resistance. Particularly, in the field of electronic products for which downsizing and weight reduction have recently been progressing, molded parts of a highly rigid fiber-reinforced resin composition have been developed for application as substitute material for metal. Heretofore, in a case where such carbon fibers are mixed and dispersed in various resins to obtain a fiber-reinforced resin material, it has been common to employ a method wherein a plurality of long carbon fibers are preliminarily bundled by a resin so-called a sizing agent and then cut into short carbon fibers, which are used to be mixed with the matrix resins.

To improve the performance of such a fiber-reinforced resin composition, it is important to increase the fiber content, and for this purpose, it has been important to obtain carbon fibers having a high bulk density.

However, heretofore, if it is attempted to cut carbon fiber strands having a high yield (the weight per 1 m of a carbon fiber strand) for the purpose of obtaining carbon fibers having a high bulk density, there has been a problem that the strands get loose, and fuzz (a few or a few tens carbon fibers separated from the main bodies of the strands) will form. Namely, carbon fibers of fine strands having a low yield, can easily be cut, but cutting of carbon fibers of thick strands having a high yield has been difficult, accompanied with loosening of the strands and formation of fuzz.

Further, when such carbon fibers are mixed with a resin, fuzz are likely to interlock one another, whereby the flowability of carbon fibers in the feeder for feeding the carbon fibers, tends to be poor, and a constant amount feeding tends to be difficult. Thus, it has been difficult to uniformly disperse such carbon fibers in the resin.

Therefore, the yield of carbon fibers in this field, particularly pitch type carbon fibers, which have been known heretofore, has been at a level of 0.8 g/m at best, and carbon fibers excellent in flowability, while having a higher yield, have been desired.

SUMMARY OF THE INVENTION

The present inventors have conducted extensive studies to solve such a problem and as a result, have found to their surprise that when carbon fibers having a high yield fuzzed by cutting are subjected to stirring treatment, fuzz will gather one another to form pills (spherical products having diameters of from 3 to 100 mm formed by interlocking of fuzz), which will be separated from the main bodies of the carbon fiber strands. And it has been found that with the carbon fibers separated from the pills, the flowability is remarkably improved.

The object of the present invention is to obtain carbon fibers which have a high bulk density and have the drawbacks resulting at the time of producing a fiber-reinforced resin material overcome, and which have good handling efficiency and are excellent in operation efficiency in the dispersing step, and further to obtain a fiber-reinforced resin composition which contains carbon fibers having a high bulk density and which has a high fiber content.

DETAILED DESCRIPTION OF THE PREFERRED EMBODIMENTS

Namely, the gist of the present invention resides in carbon fibers which are carbon fibers obtained by bundling carbon fibers having a yield of at least 0.9 g/m, followed by cutting, and which are characterized in that the following collapse initiating angle and funnel drop time are at most 65° and at most 20 seconds, respectively; a fiber-reinforced resin composition having such carbon fibers mixed to a thermoplastic resin, and a process for producing carbon fibers, which is characterized in that carbon fibers having a yield of at least 0.9 g/m are bundled by a sizing agent and then cut, and thereafter stirring treatment is applied.

As indices for the flowability, the following two parameters have been set.

(1) Collapse Initiating Angle 100 g of the carbon fibers are put into a glass Petri dish having an outer diameter of 255 mm and a height of 60 mm, and a cover is put on the Petri dish. While the outer peripheral surface of the Petri dish is positioned below, the Petri dish is gently shaked so that the upper face of the carbon fibers becomes horizontal, and when the shape is regulated, the Petri dish is placed on a horizontal table in that state. Then, the glass container is rolled until the carbon fibers start to collapse. The rolled angle at that time is measured.

(2) Funnel Drop Time 30 g of the carbon fibers are put into a powder funnel made of polypropylene (upper diameter: 100 mm, tube diameter: 25 mm, tube length: 24 mm) having its outlet preliminarily closed, a load of about 25 g/cm$^2$ is exerted for 10 seconds, and after removing the load, the outlet is opened. At that time, the time until the entire amount of the carbon fibers have dropped from the funnel, is measured. In a case where the entire amount has not dropped even upon expiration of 30 seconds or more, the measured value is taken as 30 seconds.

BEST MODE FOR CARRYING OUT THE INVENTION

Now, the present invention will be described in detail.

As the carbon fibers to be used in the present invention, conventional various carbon fibers can be used. Specifically, carbon fibers of e.g. polyacrylonitrile type, rayon type, pitch type or polyvinyl alcohol type, may be mentioned. Particularly preferred are pitch type carbon fibers produced from meso phase pitch. The carbon fibers of the present invention are those obtained by bundling these carbon fibers by a sizing agent and then cutting them by a known cutting method.

As the carbon fibers, it is preferred to employ those whereby the yield which is the weight per unit length, is at least 0.9 g/m, preferably from 1.0 g/m to 25 g/m, more preferably from 1.5 g/m to 8.0 g/m.

Those having a yield of less than 0.9 g/m are also useful, but the production costs will be high, such being economically undesirable as carbon fibers for a fiber-reinforced resin composition. Further, those having a yield of larger than 25 g/m, tend to be hardly uniformly dispersed in a resin.

As a process for producing the carbon fibers of the present invention, firstly, the carbon fibers are bundled by a sizing agent. As such a sizing agent, any optional one may be used which is commonly used for this purpose, and it is advisable to select one showing good bundling performance of monofilaments among them. Specifically, a homopolymer or a copolymer, such as an epoxy compound, a polyurethane compound, a saturated or unsaturated polyester, a polyphenylene sulfite, a polyphenylene ether, a polycarbonate, a polyoxymethylene, a polystyrene, a polyolefin, an acrylic resin, a vinyl acetate resin, an ethylene-vinyl acetate copolymer or a polyamide resin, may, for example, be mentioned. Among them, an epoxy compound or a water-soluble polyamide compound is particularly preferred.

The deposition amount of the sizing agent used, is not particularly limited so long as it is an amount which provides the bundling effect properly, and it is not different from the deposition amount in a usual sizing operation. Specifically, it is selected within a range of from 0.1 to 10 wt %, more preferably from 0.5 to 7 wt %, based on the total amount of the carbon fibers. If the deposition amount of the bundling agent is less than 0.1 wt %, the bundling performance of the carbon fibers tends to be poor, and if it exceeds 10 wt %, the bundling performance of the carbon fibers tends to be so good that the dispersibility in the resin tends to be poor, whereby the physical properties of the carbon-fiber-reinforced thermoplastic resin tend to be poor, such being undesirable.

The specific means for bundling the carbon fibers by a sizing agent may also be a conventional method. For example, a sizing agent is impregnated to long carbon fiber strands of a few hundred to a few hundred thousand fibers, followed by drying. As the impregnation method at that time, a method wherein a sizing agent is dissolved in a solvent and used as a solution, a method wherein it is dispersed in a solvent and used as an emulsion, or a method wherein it is heat-melted for use, may, for example, be mentioned. However, in the method of heat melting, the viscosity of the resin is high, and it is difficult to remove the sizing agent once deposited on the carbon fibers, and for such a reason, it is difficult to adjust the deposition amount. Besides, during the heat melting, the sizing agent is likely to undergo thermal modification and thus present an adverse effect to the physical properties such as heat resistance of the entire resin composition, such being undesirable. Thereafter, the bundled carbon fibers are cut by a conventional optional method to a predetermined length.

As the solvent to be used for dissolving or dispersing the sizing agent, 2-butanone, tetrahydrofuran, N,N-dimethylformamide, acetone, chloroform, dichloromethane alcohol or water, may, for example, be mentioned.

If necessary, a surfactant, a silane coupling agent, an epoxy curing agent, a catalyst, an adhesive, etc., may be incorporated to the solution or emulsion containing the sizing agent. As the surfactant to be used for the emulsion, at least one surfactant may, for example, be mentioned which is selected from the group consisting of a castor oil ether of polyoxymethylene, a polyoxyethylene alkyl ether or polyoxyethylene alkylallyl ether, such as nonylphenyl ether or styrene-modified phenyl ether, and a polyvinyl alcohol.

In the present invention, such carbon fibers cut to have a length of from 2 mm to 20 mm, preferably from 3 mm to 12 mm, are subjected, for example, to the following stirring treatment to obtain carbon fibers having specific physical properties of the present invention. The stirring treatment can be carried out by using an optional stirring machine. For example, a stirring machine of a cylindrical type, a V-type or a double conical type, may be used. However, it is preferred to employ a cylindrical type. Also with respect to the treating method, either method of a batch treatment system or a continuous treatment system may be employed. With respect to the stirring conditions, the charging ratio of carbon fibers into the stirring container is from 1 to 90%, preferably from 5 to 50% of the total volume of the container, and the rotational speed is from 1 to 150 rpm, preferably from 5 to 70 rpm. It is preferably carried out as dry system stirring treatment. If the stirring charging ratio is too large, the motion of the carbon fibers will be hindered, and if the charging ratio is small, fibers tend to slip on the inner wall surface of the container, whereby the stirring efficiency will be low, such being undesirable. Further, if the rotational speed is smaller than 1 rpm, no effective movement will be observed as stirring proceeds, and if it is larger than 150 rpm, an immobile portion will be formed in the carbon fiber layer in the container, whereby the stirring efficiency will be low, such being undesirable. The stirring time or the residence time in the container is preferably from 10 minutes to 30 minutes. However, if the gathering state of fuzz is good, and the flowability of the obtained carbon fibers is good, the stirring time may be less than 10 minutes. On the other hand, even if stirring is carried out for more than 30 minutes, the gathering property of the gathered bodies will not decrease, and a mixture of pills and carbon fibers having the flowability further improved, will be obtained. Then, pills are separated by a sieve to obtain the carbon fibers having good flowability. As the sieve, it is preferred to select one having the optimum opening size, taking the length of the carbon fibers obtainable as a product into consideration. The above stirring treatment is carried out by adjusting the charging ratio, the rotational speed, the stirring time or residence time, etc., so that the resulting carbon fibers will have the desired specific physical properties of this application.

By applying the above stirring treatment, it is possible to obtain carbon fibers having the specific physical properties i.e. (1) the specific collapse initiating angle and (2) the specific funnel drop time.

The collapse initiating angle is at most 65°, preferably at most 60° and at least 5°. The funnel drop time is at most 20 seconds, preferably at most 10 seconds and at least 0.1 second. If the collapse initiating angle or the funnel drop time departs from the above range, the handling efficiency in the mixing/dispersing step at the time of preparation of a fiber-reinforced resin material, tends to be poor. Further, such carbon fibers of the present invention have a bulk density of from 350 g/l to 800 g/l, preferably from 400 g/l to 700 g/l, more preferably from 450 g/l to 650 g/l.

Now, the evaluation methods will be described.

(1) Collapse Initiating Angle 100 g of the carbon fibers are put into a glass Petri dish having an outer diameter of 255 mm and a height of 60 mm, and a cover is put on the Petri dish. While the outer peripheral surface of the Petri dish is positioned below, the Petri dish is gently shaked so that the upper face of the carbon fibers becomes horizontal, and when the shape is regulated, the Petri dish is placed on a horizontal table in that state. Then, the glass container is rolled until the carbon fibers start to collapse. The rolled angle at that time is measured.

(2) Funnel Drop Time 30 g of the carbon fibers are put into a powder funnel made of polypropylene (upper diameter: 100 mm, tube diameter: 25 mm, tube length: 24 mm) having its outlet preliminarily closed, a load of about 25 g/cm² is exerted for 10 seconds, and after removing the load, the outlet is opened. At that time, the time until the entire amount of the carbon fibers have dropped from the funnel, is measured. In a case where the entire amount has not dropped even upon expiration of 30 seconds or more, the measured value is taken as 30 seconds.

(3) Bulk Density

About 30 g of the carbon fibers are weighed, and about ⅓ thereof each is sequentially put into a 200 ml measuring cylinder, and every time when the carbon fibers are put into the measuring cylinder, the measuring cylinder is dropped ten times from a height of 5 cm, and when the entire amount has been charged, the volume is read. The bulk density (d) is calculated from the weight (w) of the carbon fibers and the volume (v) after charging by the following formula:

$$d=w/v$$

If fuzz or pills are contained in the carbon fibers, the gathered bodies are likely to form bridging one another, whereby they tend to hardly collapse at the time of measuring the collapse initiating angle, or they tend to hardly slip down from the funnel, and accordingly, the collapse initiating angle and the funnel drop time will be large.

EXAMPLE 1 a: Production of Carbon Fibers

Pitch type carbon fibers having a tensile strength of 240 kg/mm², a tensile modulus of 22 ton/mm², a fiber diameter of 10 μm, a density of 2.01 g/cm³ and a yield of 1.7 g/m, were impregnated in an aqueous emulsion solution comprising 60 parts by weight of an epoxy compound "Epicoat 834" (manufactured by Shell Chemical Co.) and 40 parts by weight of "Epicoat 1004" (manufactured by Shell Chemical Co.) so that the emulsion concentration became 3 wt %, then heated and dried at about 120° C. for 20 minutes and further cut by a cutting machine to obtain carbon fibers having a length of 6 mm (the deposition amount of the epoxy compounds was 3.1 wt %). Then, the carbon fibers were put into a cylindrical stirring container having an inner diameter of 400 mm in an amount of 10% of the total volume of the container, then stirred at a rotational speed of 30 rpm for 10 minutes and sieved to separate pills to obtain carbon fibers. The obtained carbon fibers had a bulk density of 530 g/l, a collapse initiating angle of 55° and a funnel drop time of 1 second.

b: Production of a Fiber-Reinforced Resin Material

25 Parts by weight of the above carbon fibers and 100 parts by weight of dried polyoxymethylene resin pellets ("Juracon M90-02", manufactured by Polyplastic Co.) were dry-blended, then charged into a screw extruder, melt-mixed, extruded in the form of strands and cooled with water, followed by cutting into pellets. The carbon fibers of the present invention were excellent in handling efficiency and could therefore easily be mixed with the polyoxymethylene resin.

Comparative Example 1

Carbon fibers and a fiber-reinforced resin material were produced in the same manner as in Example 1 except that no stirring treatment in a cylindrical container was carried out. The obtained carbon fibers had a bulk density of 430 g/l, a collapse initiating angle of 72° and a funnel drop time of 30 seconds. Further, at the time of mixing with the polyoxymethylene resin, the flowability of the carbon fibers in the feeder was poor, and the feeding was instable.

EXAMPLE 2 a: Production of Carbon Fibers

Pitch type carbon fibers having a tensile strength of 240 kg/mm², a tensile modulus of 22 ton/mm², a fiber diameter of 10 μm, a density of 2.01 g/cm³ and a yield of 3.8 g/m, were impregnated in an aqueous emulsion solution prepared so that the emulsion concentration of a water-soluble polyamide compound became 3 wt %, then heated and dried at about 120° C. for 20 minutes and further cut by a cutting machine to obtain carbon fibers having a length of 6 mm (the deposition amount of the polyamide compound was 3.8 wt %). Then, the carbon fibers were put into a cylindrical stirring container having an inner diameter of 400 mm in an amount of 10% of the total volume of the container, stirred at a rotational speed of 30 rpm and sieved to separate pills to obtain carbon fibers. The obtained carbon fibers had a bulk density of 510 g/l, a collapse initiating angle of 57° and a funnel drop time of 1 second.

b: Production of a Fiber-Reinforced Resin Material

25 Parts by weight of the above carbon fibers and 100 parts by weight of polyoxymethylene resin pellets ("Juracon M90-02", manufactured by Polyplastic Co.) were dry-blended, then charged into a screw extruder, melt-mixed, extruded in the form of strands and cooled with water, followed by cutting into pellets. The carbon fibers of the present invention were excellent in handling efficiency and could therefore easily be mixed with the polyoxymethylene resin.

Comparative Example 2

Carbon fibers were produced in the same manner as in Example 2 except that no stirring treatment in a cylindrical container was carried out. The obtained carbon fibers had a bulk density of 440 g/l, a collapse initiating angle of 64° and a funnel drop time of 30 seconds. Further, at the time of mixing with the polyoxymethylene resin, the flowability of the carbon fibers in the feeder was poor, and the feeding was instable.

TABLE I

|  | Bulk Yield (g/m) | initiating density (g/l) | Collapse dropping angle (degree) | Funnel time (seconds) |
| --- | --- | --- | --- | --- |
| Example 1 | 1.7 | 530 | 55 | 1 |
| Example 2 | 3.8 | 510 | 57 | 3 |
| Comparative Example 1 | 1.7 | 430 | 72 | 30 |
| Comparative Example 2 | 3.8 | 440 | 64 | 30 |

Industrial Applicability

The present invention overcomes the drawbacks resulting during the production of a fiber-reinforced resin material and provides carbon fibers having good handling efficiency i.e. being excellent in the operation efficiency in the step of mixing and dispersing.

Further, the carbon fibers of the present invention have a high bulk density, whereby a fiber-reinforced resin composition having a high fiber content can easily be obtained, such being desirable.

We claim:

1. Bundled and cut carbon fibers having a bulk density of from 450 g/l to 650 g/l, which are obtained by bundling carbon fibers having a yield of at least 0.9 g/m followed by cutting, and having a collapse initiating angle and funnel drop time of at most 65° and at most 20 seconds, respectively.

2. The bundled and cut carbon fibers of claim 1, wherein the length of the carbon fibers is from 2 mm to 20 mm.

3. The bundled and cut carbon fibers of claim 1, wherein the carbon fibers are pitch-based carbon fibers.

4. The bundled and cut carbon fibers of claim 1, wherein said bulk density is at least 510 g/l.

5. The bundled and cut carbon fibers of claim 4, wherein said bulk density is at least 530 g/l.

6. The bundled and cut fibers of claim 1, wherein said bundled carbon fibers have a yield of from 1.0 g/m to 25 g/m.

7. The bundled and cut fibers of claim 6, wherein said bundled carbon fibers have a yield of from 1.5 g/to 8.0 g/m.

8. A fiber-reinforced resin composition, which is produced by mixing in a thermoplastic resin, bundled and cut carbon fibers having a bulk density of from 450 g/l to 650 g/l, which are obtained by bundling carbon fibers having a yield of at least 0.9 g/m, followed by cutting, and wherein a collapse initiating angle and funnel drop time are at most 65° and at most 20 seconds, respectively.

9. The fiber-reinforced resin composition of claim 8, wherein the length of the carbon fibers mixed in the thermoplastic resin is from 2 mm to 20 mm.

10. The fiber-reinforced resin composition of claim 8, wherein the carbon fibers are pitch-based carbon fibers.

11. The bundled and cut fibers of claim 8, wherein said bulk density is at least 510 g/l.

12. The bundled and cut carbon fibers of claim 11 wherein said bulk density is at least 530 g/l.

13. The bundled and cut carbon fibers of claim 8 wherein said bundled carbon fibers have a yield of from 1.0 g/m to 25 g/m.

14. The bundled and cut fibers of claim 13, wherein said bundled carbon fibers have a yield of from 1.5 g/m to 8.0 g/m.

15. A process for producing carbon fibers, which comprises:

a) bundling carbon fibers having a yield of at least 0.9 g/m by a sizing agent, and then;

b) cutting said bundled fibers, and thereafter;

c) applying a stirring treatment to said cut and bundled fibers to obtain carbon fibers having a collapse initiating angle and funnel drop time of at most 65° and at most 20 seconds, respectively; and d) separating and removing pills.

* * * * *